US009893976B2

(12) United States Patent
Wahler

(10) Patent No.: US 9,893,976 B2
(45) Date of Patent: Feb. 13, 2018

(54) GROUND SYSTEM FOR VEHICLE DATA DISTRIBUTION

(71) Applicant: GOGO LLC, Chicago, IL (US)

(72) Inventor: Ronald A. Wahler, Boulder, CO (US)

(73) Assignee: GOGO LLC, Chicago, IL (US)

( * ) Notice: Subject to any disclaimer, the term of this patent is extended or adjusted under 35 U.S.C. 154(b) by 218 days.

(21) Appl. No.: 14/797,461

(22) Filed: Jul. 13, 2015

(65) Prior Publication Data
US 2015/0319073 A1 Nov. 5, 2015

Related U.S. Application Data

(62) Division of application No. 13/675,190, filed on Nov. 13, 2012, now Pat. No. 9,088,613.

(51) Int. Cl.
H04B 1/20 (2006.01)
G08G 1/123 (2006.01)
(Continued)

(52) U.S. Cl.
CPC .............. *H04L 45/02* (2013.01); *G01C 21/34* (2013.01); *H04L 67/12* (2013.01); *H04L 67/18* (2013.01); *H04W 4/04* (2013.01)

(58) Field of Classification Search
None
See application file for complete search history.

(56) References Cited

U.S. PATENT DOCUMENTS 3,755,781 A * 8/1973 Haas ..................... H04L 12/403
340/10.2
3,755,782 A * 8/1973 Haas ..................... H04L 12/403
340/10.2
(Continued)

FOREIGN PATENT DOCUMENTS

WO WO-2008/138376 A1 11/2008

OTHER PUBLICATIONS

Digital Video Broadcasting (DVB); DVB-S2 Adaptive Coding and Modulation for Broadband Hybrid Satellite Dialup Applications,: ETSI TS 102 441 V1.1.1, Oct. 2005, 23 pages.
(Continued)

Primary Examiner — Steven Lim
Assistant Examiner — Muhammad Adnan
(74) Attorney, Agent, or Firm — Marshall, Gerstein & Borun LLP; Randall G. Rueth

(57) ABSTRACT

Techniques for delivering data or information to a vehicle include a method of distributing information to a vehicle. Information corresponding to the vehicle is first received while the vehicle is en route between an origination point and a destination from a computing device that is not being transported by the vehicle. A first computing device or a second computing device determines a destination port at which the vehicle is to arrive, the destination port included in a plurality of ports at which vehicles arrive and from which vehicles depart. The first computing devices causes data to be routed to a third computing device communicatively connected to the first computing device, the third computing device corresponding to the destination port, and at least one of the data or the third party computing device determined based on the information received at the first computing device.

14 Claims, 4 Drawing Sheets

(51) Int. Cl.
  *H04B 14/00* (2006.01)
  *B60R 25/10* (2013.01)
  *G05B 19/02* (2006.01)
  *G01C 21/34* (2006.01)
  *H04L 12/751* (2013.01)
  *H04L 29/08* (2006.01)
  *H04W 4/04* (2009.01)

(56) References Cited

U.S. PATENT DOCUMENTS

| | | | |
|---|---|---|---|
| 5,144,315 A * | 9/1992 | Schwab | G01S 5/0009 342/169 |
| 5,627,517 A * | 5/1997 | Theimer | G01S 13/78 340/426.2 |
| 5,652,795 A | 7/1997 | Dillon et al. | |
| 5,699,384 A | 12/1997 | Dillon | |
| 5,842,555 A * | 12/1998 | Gannon | B64F 1/368 198/349.5 |
| 5,892,441 A * | 4/1999 | Woolley | G01S 5/0289 235/384 |
| 5,995,725 A | 11/1999 | Dillon | |
| 5,995,726 A | 11/1999 | Dillon | |
| 6,016,388 A | 1/2000 | Dillon | |
| 6,047,165 A * | 4/2000 | Wright | G05D 1/0055 340/945 |
| 6,104,926 A | 8/2000 | Hogg et al. | |
| 6,122,514 A * | 9/2000 | Spaur | H04W 72/042 370/468 |
| 6,125,184 A | 9/2000 | Dillon et al. | |
| 6,131,160 A | 10/2000 | Dillon et al. | |
| 6,161,141 A | 12/2000 | Dillon | |
| 6,182,009 B1 * | 1/2001 | Brocke | G01C 21/28 340/991 |
| 6,240,362 B1 * | 5/2001 | Gaspard, II | G01C 21/343 340/991 |
| 6,246,320 B1 * | 6/2001 | Monroe | B64D 45/0015 340/506 |
| 6,304,856 B1 * | 10/2001 | Soga | G06Q 10/063 705/28 |
| 6,430,412 B1 | 8/2002 | Hogg et al. | |
| 6,795,823 B1 * | 9/2004 | Aklepi | G06Q 10/08 707/781 |
| 6,799,037 B1 | 9/2004 | Mielke et al. | |
| 6,909,898 B2 | 6/2005 | Mielke et al. | |
| 7,243,845 B2 * | 7/2007 | Cash | G06Q 10/08 235/384 |
| 7,283,810 B1 * | 10/2007 | Arakawa | G08C 17/02 340/438 |
| 7,382,752 B2 * | 6/2008 | Melhuish | H04B 7/26 370/335 |
| 7,426,387 B2 | 9/2008 | Wright et al. | |
| 7,426,388 B1 | 9/2008 | Wright et al. | |
| 7,428,412 B2 | 9/2008 | Wright et al. | |
| 7,450,955 B2 | 11/2008 | Himmelstein | |
| 7,559,691 B2 | 7/2009 | Fuhrmann | |
| 7,599,691 B2 | 10/2009 | Mitchell | |
| 7,689,752 B1 | 3/2010 | Redford et al. | |
| RE42,536 E | 7/2011 | Leuca et al. | |
| 8,032,135 B1 | 10/2011 | Redford et al. | |
| 8,094,605 B2 | 1/2012 | Lynch et al. | |
| 8,116,797 B2 * | 2/2012 | Brady, Jr. | H04W 4/02 370/310 |
| 8,140,732 B2 | 3/2012 | Redford et al. | |
| 8,253,557 B2 * | 8/2012 | Ani | G06Q 10/08 340/539.1 |
| 8,432,256 B2 * | 4/2013 | Oki | G06Q 10/02 340/10.1 |
| 8,437,958 B2 * | 5/2013 | Krause | G01C 21/3407 340/995.19 |
| 8,457,034 B2 | 6/2013 | Kuehl et al. | |
| 8,509,140 B2 * | 8/2013 | Kauffman | H04B 7/18504 370/310 |
| 8,606,266 B1 * | 12/2013 | Mitchell | H04L 69/321 455/427 |
| 8,606,491 B2 * | 12/2013 | Subbu | G06Q 10/047 340/961 |
| 8,751,073 B2 | 6/2014 | Kumar et al. | |
| 8,972,190 B1 * | 3/2015 | Pech | G06Q 10/047 701/540 |
| 9,087,193 B2 * | 7/2015 | Wahler | H04L 29/08144 |
| 9,088,613 B2 * | 7/2015 | Wahler | H04W 4/04 |
| 9,134,426 B1 * | 9/2015 | Siris | G01S 19/07 |
| 9,258,432 B2 * | 2/2016 | Lauer | H04M 15/735 |
| 9,326,217 B2 * | 4/2016 | Lauer | H04L 12/189 |
| 9,426,650 B2 * | 8/2016 | Bangole | H04W 12/04 |
| 9,467,828 B2 * | 10/2016 | Lauer | H04W 12/06 |
| 9,577,857 B2 * | 2/2017 | Lauer | H04L 5/1453 |
| 9,578,104 B2 * | 2/2017 | Bangole | H04L 63/0428 |
| 9,591,077 B2 * | 3/2017 | Bangole | H04L 67/12 |
| 9,603,046 B2 * | 3/2017 | Seo | H04W 28/0247 |
| 9,648,468 B2 * | 5/2017 | Arbe | H04W 4/12 |
| 9,655,073 B2 * | 5/2017 | Lauer | H04W 60/04 |
| 9,712,668 B2 * | 7/2017 | Arbe | H04M 3/42365 |
| 9,716,542 B2 * | 7/2017 | Lauer | H04B 7/18506 |
| 2002/0027512 A1 * | 3/2002 | Horita | G08G 1/0962 340/988 |
| 2002/0070882 A1 * | 6/2002 | Jones | G08G 1/123 340/988 |
| 2002/0095498 A1 * | 7/2002 | Chanda | H04L 12/2889 709/225 |
| 2003/0055975 A1 * | 3/2003 | Nelson | H04B 7/18506 709/227 |
| 2003/0137435 A1 * | 7/2003 | Haddad | G08G 1/133 340/994 |
| 2003/0171094 A1 * | 9/2003 | Kawai | H04W 4/00 455/3.01 |
| 2004/0054918 A1 | 3/2004 | Duri et al. | |
| 2004/0186760 A1 * | 9/2004 | Metzger | G06Q 10/087 705/28 |
| 2004/0267410 A1 | 12/2004 | Duri et al. | |
| 2005/0090283 A1 * | 4/2005 | Rodriquez | H04W 72/0413 455/552.1 |
| 2005/0286452 A1 * | 12/2005 | Hardgrave | H04W 84/005 370/310 |
| 2007/0208864 A1 * | 9/2007 | Flynn | H04L 63/02 709/227 |
| 2008/0030379 A1 * | 2/2008 | Park | G08G 1/092 340/994 |
| 2008/0140571 A1 | 6/2008 | Inbarajan et al. | |
| 2008/0252487 A1 * | 10/2008 | McClellan | G01S 5/0027 340/936 |
| 2008/0291052 A1 * | 11/2008 | Burns | G08G 1/164 340/903 |
| 2009/0100476 A1 * | 4/2009 | Frisco | H04B 7/18508 725/68 |
| 2010/0127193 A1 | 5/2010 | Abernathy et al. | |
| 2010/0191754 A1 * | 7/2010 | Baker | G06Q 10/109 707/758 |
| 2011/0095905 A1 | 4/2011 | Mase | |
| 2011/0257834 A1 * | 10/2011 | Hebb | G06Q 10/08 701/31.4 |
| 2012/0026017 A1 * | 2/2012 | Horstemeyer | B60R 25/102 340/994 |
| 2012/0214506 A1 * | 8/2012 | Skaaksrud | H04W 40/20 455/456.1 |
| 2012/0303826 A1 * | 11/2012 | Nelson | H04B 7/18506 709/228 |
| 2013/0083679 A1 * | 4/2013 | Krishnaswamy | G08G 1/093 370/252 |
| 2013/0234849 A1 * | 9/2013 | Gupta | A45C 13/18 340/539.11 |
| 2014/0309885 A1 * | 10/2014 | Ricci | H04W 48/04 701/41 |
| 2014/0340241 A1 * | 11/2014 | Smart, Jr. | G08G 1/142 340/932.2 |
| 2015/0154865 A1 * | 6/2015 | Nakakuki | G08G 1/161 340/905 |

(56) References Cited

U.S. PATENT DOCUMENTS

2016/0055744 A1* 2/2016 Branson .................. G08G 1/07
340/916

OTHER PUBLICATIONS

"Digital Video Broadcasting (DVB); Interaction channel through Public Switched Telecommunications Network (PSTN) / Integrated Services Digital Networks (ISDN)," European Telecommunication Standard, ETS 300 801: Aug. 1997, 14 pages.

"Digital Video Broadcasting (DVB); Interaction channel through the Global System for Mobile Communications (GSM)," European Broadcasting Union, EN 301 195 V1.1.1, Feb. 1999, 14 pages.

International Preliminary Report on Patentability, International Application No. PCT/US2013/069536, dated Feb. 11, 2015.

International Search Report and Written Opinion for Application No. PCT/US2013/069536 dated Feb. 24, 2014.

Second Written Opinion, International Application No. PCT/US2013/069536, dated Oct. 20, 2014.

* cited by examiner

GROUND SYSTEM FOR VEHICLE DATA DISTRIBUTION

CROSS-REFERENCE TO RELATED APPLICATIONS

This application is a divisional of U.S. patent application Ser. No. 13/675,190, filed Nov. 13, 2012, entitled "Ground System For Vehicle Data Distribution," the disclosure of which is hereby incorporated herein by reference in its entirety for all purposes.

FIELD AND BACKGROUND OF THE DISCLOSURE

Technical Field

The instant disclosure generally relates to distributing data to a vehicle. More particularly, the instant disclosure generally relates distributing data to a predicted location of the vehicle.

Background

Known systems and methods for delivering data or information to a vehicle often initiate data transfer only after a vehicle has arrived at a port, terminal, station or dock. Such systems and methods typically are disparate and operate independently for different types of data or information. For example, after an aircraft has arrived at a gate, cabin personnel may manually load a new suite of movies and other entertainment media onto a hard drive on-board the aircraft. Maintenance personnel may retrieve in-fight data for the completed flight, and may initiate software updates to various devices within the aircraft. In the cockpit, pilots for a subsequent flight of the aircraft may request and obtain flight charts, plans and maps. Furthermore, in addition to the multiplicity of different personnel and means of data transfer for multiple types of data, such systems typically require the vehicle to be parked or docked before data retrieval and transfer may be even initiated, which prolongs the time during which the vehicle is not available for travel.

BRIEF SUMMARY OF THE DISCLOSURE

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

An embodiment of an information distribution system for distributing information or data to a vehicle may include a plurality of computing devices in communicative connection. At least some of the plurality of the computing devices may correspond to respective ports from which vehicles may depart and at which vehicles may arrive. At least some of the plurality of computing devices may have respective connections for communicating with an on-board data distribution device fixedly connected to the vehicle. At least one computing device of the plurality of computing devices may be configured to receive, via a respective connection, information from the vehicle, and may be further configured to cause data to be routed to another computing device that corresponds to a predicted location of the vehicle. In some cases, the data is caused to be routed to more than one computing device each corresponding to a different location. The data to be routed to the one or more predicted locations and/or the identities of the one or more predicted locations may be determined based on the information received from the vehicle.

An embodiment of a method of distributing information to a vehicle may include receiving information corresponding to the vehicle while the vehicle is en route between an origination point and a destination point. The method may also include determining a destination port at which the vehicle is to arrive, where the destination port is included in a plurality of ports at which vehicles may arrive and from which vehicles may depart. Additionally, the method may include causing data to be routed to the destination port. The content of the data to be routed and/or a prediction of the destination port may be determined based on the received information corresponding to the vehicle. In some cases, the data may be caused to be routed to more than one destination port.

An embodiment of a method of distributing information to a vehicle may include receiving, at a first computing device, data from a second computing device in communicative connection with the first computing device. The first computing device may correspond to a destination port at which the vehicle is predicted to arrive, where the destination port is included in a plurality of ports at which vehicles may arrive and from which vehicles may depart. The content of the received data and/or the identification of the predicted destination port may have been determined based on information received by the second computing device while the vehicle is en route between an origination point and a destination point. The method may further include transmitting, by the first computing device, the received data to an on-board data distribution device fixedly connected to the vehicle after the vehicle has arrived at the predicted destination port.

DETAILED DESCRIPTION OF THE PREFERRED EMBODIMENTS

Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Any or all of the contents of the present disclosure may operate in conjunction with any or all of the contents of the disclosure of co-pending U.S. patent application Ser. No. 13/675,194 entitled "PUBLISHER AND SUBSCRIBER MESSAGING SYSTEM AND METHOD" and filed concurrently herewith, the contents of which are hereby incorporated by reference in their entirety. Additionally or alternatively, any or all of the contents of the present disclosure may operate in conjunction with any or all of the contents of the disclosure of co-pending U.S. patent application Ser. No. 13/675,200 entitled "VEHICLE DATA DISTRIBUTION SYSTEM AND METHOD" and filed concurrently herewith, the contents of which are hereby incorporated by reference in their entirety.

Figure 1:
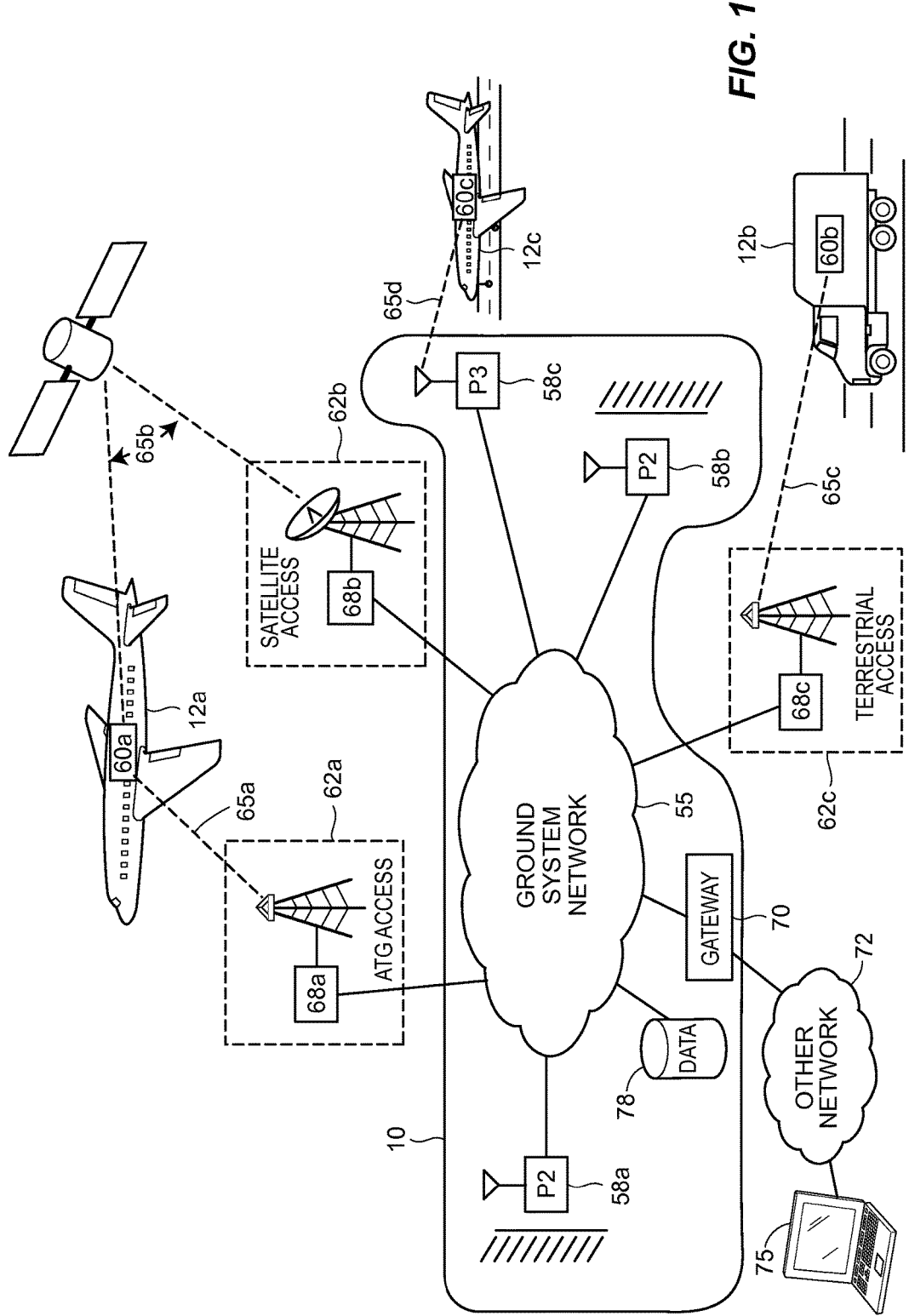
FIG. 1 is a block diagram of an example ground based information or data distribution system for distributing information or data to a vehicle.

FIG. 1 illustrates an example ground based information distribution system 10 for delivering data to a vehicle, such as vehicles 12a-12c, and in particular, for delivering data to be distributed to the vehicle 12 at a predicted location while the vehicle 12 is en route. The ground based information distribution system 10 is also referred to interchangeably herein as a "ground based data distribution system," a "ground based data system," a "ground based information system," a "ground based system," or a "ground system." The system 10 is "ground based" as a majority of the devices included in the system may be essentially terrestrially located, e.g., the devices may be respectively disposed within structures that are connected to the ground (e.g., within structures that are not air-borne or water-borne).

The ground based system 10 may include a network 55 via which information, data and/or communications are delivered to predicted locations, and/or are delivered to vehicles 12 at the predicted locations, in an embodiment. The network 55 may be a public network, a private network, or some combination of a public and a private network. The network 55 may be a communications network, a data network, a packet network, or some combination thereof. The network 55 may be a hosted network, or may be a peer-to-peer or other type of ad-hoc network. Indeed, the network 55 may use any known networking technology to deliver data to vehicles. Generally, the network 55 may include a plurality of computing devices that are in communicative connection.

The network 55 of the ground based system 100 may be communicatively connected to one or more networks 58a, 58b, 58c, each of which may be located and/or hosted at a respective port, terminal, station or way station, dock, bay, garage, vehicle maintenance location, or other location at which vehicles may be parked or stationed for a temporary amount of time. Such locations are generally referred to herein as a "port." Generally, a port may be a designated location from which vehicles may depart and at which vehicles may arrive. Examples of ports may include airports, helicopter pads, harbors, railroad stations, hospitals, shipping terminals, bus terminals, fueling stations, vehicle maintenance or service areas, military bases, ports or aircraft carriers, and the like. A vehicle 12 may originate a travel route or a leg of a travel route from a particular port, and a vehicle may terminate a travel route or a leg of a travel route at another port. Some ports may be intermediate stops along a vehicle's travel route. A vehicle 12 may be stationed at a port to load or unload passengers, cargo, fuel, equipment and/or supplies. In FIG. 1, the network 58a corresponds to port P1, the network 58b corresponds to port P2, and the network 58c corresponds to the port P3. As such, the networks 58a, 58b, 58c are referred to here-in as "port networks." In an embodiment, port networks 58a-58c may provide vehicles 12 with access to the ground based system 10 when the vehicles may arrive and are located at the port environs. Although FIG. 1 depicts the ground based system 10 as including three port networks 58a-58c, the ground based system 10 may include any number of port networks, such as one port network, two port networks, or more than three port networks. In some cases, a single port or location may be serviced by more than one port network. In some embodiments, one or more port networks 58a-58c may be excluded from the ground based system 10, but may still be in communicative connection with the ground based system 10, for example, if the ground based system 10 and a particular port network are operated by different providers.

Port networks 58a-58c may be private networks, public networks, or some combination of private and public networks. Generally, a port network 58a-58c may include one more computing devices which are communicatively connected and that are situated in and around the port. A port network 58a-58c may include a single computing device or may include multiple computing devices arranged in a local network configuration. In some embodiments, at least some of the computing devices included in the port network 58a-58c may also be included in the network 55. When a vehicle 12 has arrived at a particular port and is parked, stationed or moving about the port (as denoted in FIG. 1 by vehicle 12c), the vehicle 12c may communicate with the respective port network 58c via a wireless or wired connection 65d. For example, the vehicle 12c may communicate with the port network 58c using a Wi-Fi™, WLAN (Wireless Local Access Network), or other type of wireless connection. In another example, the vehicle 12c may communicate with the port network 58c using a wired connection, such as a wired Ethernet or T1 connection.

In an embodiment, the vehicle 12c may communicate with one of the port networks 58a-58c using an on-board data distribution device 60c. The on-board data distribution device 60c may include a plurality of interfaces to a plurality of bearers or communication channels, such as the bearers 65a-65d illustrated in FIG. 1 (which will be described in more detail in a later section). In an embodiment, at least one of these bearers may include a wireless communication channel 65d to a port network 58c. In another embodiment, at least one of the bearers may include a wired connection to the port network 58c (not shown). The plurality of interfaces included in the on-board data distribution device 60c may be fixedly connected to the vehicle 12c, in an embodiment. For example, the plurality of interfaces may be included in one or more Line Replaceable Units (LRUs) or other entities that are fixedly attached to the vehicle 12c. A description of embodiments of the on-board data distribution devices 60a-60c included respectively in the vehicles 12a-12c may be found in the aforementioned co-pending U.S. patent application Ser. No. 13/675,200 entitled "VEHICLE DATA DISTRIBUTION SYSTEM AND METHOD."

In an embodiment, the vehicle 12c (and the vehicles 12a 12b, when they respectively arrive at ports) may detect and communicate with the port network 58c using a wireless protocol. For example, the wireless protocol may be the messaging protocol described aforementioned co-pending U.S. patent application Ser. No. 13/675,194 entitled "PUBLISHER AND SUBSCRIBER MESSAGING SYSTEM AND METHOD," however, other wireless communication protocols (either public or private) that enable discovery and communication may be used. In an embodiment, the vehicle 12c (or its on-board data distribution device 60c, in some embodiments) and a computing device of the port network 58c may discover and authenticate one another and may establish a publisher/subscriber relationship to transfer data between the vehicle 12c and the port network 58c. Data may be delivered to the vehicle 12c from the port network 58c and may be received from the vehicle 12c by the port network 58c while the vehicle 12c is stationed at the port or otherwise is communicative connection with the port network 58c, e.g., while the vehicle 12c is parked, taxiing or moving about the port location.

On the other hand, while a vehicle 12 is traveling a route or is otherwise moving between an origination point and a destination point (as denoted in FIG. 1 by the vehicles 12a and 12b), and is not near or in communicative connection with any port, the vehicle 12 may communicate with the ground based system 10 using one or more access networks 62a-62c (denoted in FIG. 1 by the vehicles 12b and 12c). Generally, an access network 62a-62c may include one or more computing devices which are communicatively connected and that are situated in and around a location at which one or more access point antennas are disposed. An access network 62a-62c may include a single computing device or may include multiple computing devices arranged in a local network configuration. In some embodiments, at least some of the computing devices included in the access network 62a-62c may also be included in the network 55. Any suitable number of access networks 62a-62c may be included in the ground based system 10 so that vehicles may be in communicative contact with the ground system 10 whilst traveling their respective routes, in an embodiment. In some embodiments, one or more access networks 62a-62c may be excluded from the ground based system 10 but still may be in communicative connection with the ground based system 10, such as when respective providers of the ground based system 10 and of a particular access network are different business or organizations.

Typically, the access networks 62a-62c coupled to the ground based system network 55 may support wireless communications, and may utilize any suitable wireless technology. For example, the access network 62a may be an air-to-ground (ATG) network that utilizes an EVDO (Evolution Data Optimized) protocol to communicate with a vehicle 12a over one or more designated channels 65a (e.g., the 849-851 MHz and 894-896 MHz frequency bands). The access network 62a may include a computing device 68a that is in communicative connection with the network 55 and with the channel(s) 65a to support data transfer between the vehicle 12a and the network 55. In another example, the access network 62b may be a satellite communications network, such as a satellite communications network that utilizes the $K_u$ band (e.g., 12-18 GHz), the $K_a$ band (e.g., 26.5-40 GHz) or other band suitable for satellite data communications (denoted generically in FIG. 1 by the reference 65b). The satellite access network 62b may include a computing device 68b that is in communicative connection with the network 55 and with the communication channel(s) 65b to support transfer of data between the vehicle 12a and the network 55 using the satellite communication channel(s) 65b.

In yet another example, the access network 62c may be a terrestrial access network that utilizes cellular or mobile wireless protocols (e.g., TDMA (Time Division Multiple Access), GSM (Global System for Mobile Communications), CDMA (Code Division Multiple Access, LTE (Long Term Evolution), and/or other mobile communications technologies) over corresponding bands to transfer data between the ground based system 10 and terrestrial vehicles, e.g., the vehicle 12b. In an embodiment, a terrestrial vehicle 12b may include a respective instance 60b of an on-board data distribution device via which data transfer onto and off of the vehicle 12b is effected. The terrestrial access network 62c may include a computing device 68c in communicative connection with the network 55 and with the communication channel(s) 65c to support transfer of data between the vehicle 12b and the network 55.

Although FIG. 1 illustrates the ground based system 10 as including three access networks 68a-68c, the ground based system 10 may include or be in communicative connection with any number of access networks, such as one access network, two access networks, or more than three access networks. Moreover, as described above, each access network 62 may utilize any known wireless communication or data technology to transfer data to and/or from a moving vehicle 12. As such, at least some of the access networks 62a-62c may be of different types (e.g., satellite, terrestrial access, ATG, Wi-Fi, etc.). In some embodiments, a data or information transfer session or call may be handed off from one access network 62a to another 62b, such as in a manner described in the aforementioned co-pending U.S. patent application Ser. No. 13/675,200 entitled "VEHICLE DATA DISTRIBUTION SYSTEM AND METHOD." Hand-offs may be performed between access networks of different types and using different communication technologies, in an embodiment.

The ground based information distribution system 10 may include one or more gateways 70 to other networks 72. Generally, a gateway 70 may include one or more computing devices in communicative connection. In some embodiments, at least some of the computing devices included in the gateway 70 may also be included in the network 55. The other networks 72 in communicative connection with the gateway 70 may include, for example, the Internet or some other public network. The other networks 72 may alternatively or additionally include one or more private networks. In an embodiment, a user may access the ground based system 10 via a computing device 75 or other user interface that is communicatively connected to the gateway 70 via the one or more networks 72. For example, the user may access the ground based system 10 at the computing device 75 via a website that may be hosted in the network 55 and accessed via the gateway 70. User access to the ground based system 10 may be controlled, and may require granting of access permission. In an embodiment, a user 75 may access a private account stored in and administered by the network 55.

Further, the ground based system 10 may include one or more data storage devices 78. The one or more data storage devices 78 may utilize any known data storage technology, such as data banks, data warehouses, servers, data farms, cloud storage, and the like. At least a portion of the data storage devices may be accessed (e.g., read, write, modify, delete, add, etc.) by computing devices included in the network 55. In an embodiment, one or more of the port networks 58a-58c, the access networks 62a, 62b, and/or the gateways 70 may access at least a portion of the data storage device(s) 78. The data storage devices 78 may store data corresponding to each of the vehicles 12. For example, the data storage devices 78 may store one or more user accounts, which may correspond to a particular vehicle, a particular fleet of vehicles, a particular customer or system user, a particular company, and other desired types of accounts. Additionally, the data storage devices 78 may store information or data for each vehicle and/or for each system user for remote loading onto vehicles 12 or off-loading from vehicles 12. In an embodiment, the data corresponding to the vehicles 12 may include user preferences for selecting data transfer bearers, such as described in aforementioned co-pending U.S. patent application Ser. No. 13/675,200, entitled "VEHICLE DATA DISTRIBUTION SYSTEM AND METHOD." The one or more data storage devices 78 may be redundant, or may otherwise provide a desired level of security and data integrity.

Still further, the ground based system 10 may include one or more computing devices 80 including a ground based determination engine 85 in communicative connection with the network 55. In an embodiment, the ground based determination engine 85 may comprise a set of computer-executable instructions that are stored on a tangible, non-transitory computer-readable storage medium such as a memory, one or more memory devices, one or more data storage devices, and the like.

The computer-executable instructions of the ground based determination engine 85 may be executable by a processor to determine a content of data that is to be delivered to a vehicle 12, and/or to determine or predict a location or port at which the vehicle 12 will arrive or traverse and to which the data is to be delivered, in some embodiments. In an embodiment, the ground based determination engine 85 may receive requests for data from remote users 75 and from one of more vehicles 12. The ground based determination engine 85 may obtain or otherwise determine the requested data (e.g., by accessing the one or more data storage devices 78 and/or by querying other databases via other networks 72). In some scenarios, the request of the remote user 75 or the vehicle 12 may include the content of data that is to be delivered.

Additionally or alternatively, the ground based determination engine 85 may determine a predicted location of the vehicle 12 to which the data is to be delivered. For example, the ground based determination engine 85 may determine a location at which the vehicle 12 is predicted to arrive or traverse. In some embodiments, the predicted location may be a port at which the vehicle 12 is predicted to arrive, e.g., a predicted destination port. The predicted destination port may be one of a plurality of ports at which vehicles may arrive and from which vehicles may depart, for example. In another embodiment, the predicted location may correspond to a location of an access network 62a-62c with which the vehicle 12 is predicted to be in communicative connection whilst the vehicle 12 is en route from an origination point to a destination point. In some cases, the ground based determination engine 85 may determine a plurality of ports to which the data is to be delivered, e.g., a set of ports in a geographical vicinity, all of the ports included the ground based system 10, or a selected subset of ports included in the ground based system 10. For example, if a vehicle is one of many vehicles that are being re-routed to a regional area due to weather conditions, the ground based determination engine 85 may determine that the ports of the regional area are to receive the data.

In an embodiment, the ground based determination engine 85 may cause the data to be delivered to the predicted location(s) for transfer to the vehicle 12. For example, if a predicted location is a predicted destination port, the ground based determination engine 85 may cause the data to be delivered to a respective port network 58a-58c, and the port network 58a-58c may cause the data to be transferred to the vehicle 12 after the vehicle 12 has arrived at the port. The data may be delivered to the port network 58a-58c corresponding to the predicted destination port prior to the vehicle's arrival at the predicted destination port, in an embodiment. In another example, if a predicted location is a predicted location of vehicle traversal, the ground based determination engine 85 may cause the data to be delivered to a respective access network 62a-62c, and the access network 62a-62c may cause the data to be transferred to the vehicle 12 whilst the vehicle 12 is in communicative connection with the access network 62a-62c. The data may be delivered to the port network 58a-58c corresponding to the predicted access network 62a-62c prior to the vehicle's traversal, in an embodiment. As such, the ground based system 10 may serve as a store and forward network for data that is to be transferred onto and off of vehicles 12.

As discussed above, the computer-executable instructions corresponding to the ground based determination engine 85 may be executable by a processor. The processor may be included in the one or more computing devices 80 of the ground based system 10, in an embodiment. The tangible computer-readable storage medium on which the ground based determination engine 85 is stored, though, may or may not be included in the one or more computing devices 80. For example, the tangible computer-readable storage medium on which the ground based determination engine 85 is stored may be included in the one or more data storage devices 78 or in some other data storage device or devices that are accessible to the network 55, in an embodiment. In any case, the tangible computer-readable storage medium may be accessible to the processor that is included in the one or more computing devices 80 to execute the instructions for the ground based determination engine 85.

The one or more computing devices 80 may be included in the network 55, for example. In an embodiment, the one or more computing devices 80 may include at least one of the computing devices 68a-68c included in the access networks 62a-62c. In an embodiment, the one or more computing devices 80 may include at least one of the computing devices included in the port networks 58a-58c. In an embodiment, the one or more computing devices 80 may include at least one gateway computing device 70. In an embodiment, the one or more computing devices 80 are excluded from both the access networks 62 and the port networks 58.

Turning to the vehicles 12a-12c illustrated in FIG. 1, each of the vehicles 12a-12c may be owned and/or operated by an individual, or each of the vehicles 12a-12c may be owned and/or operated by a company, organization or governmental entity. Each of the vehicles 12a-12c may be one of a fleet of vehicles, in some cases. In some embodiments, at least one of the vehicles 12a-12c may be used to transport passengers who pay for or otherwise are granted passage on the vehicle. In some embodiments, at least one of the vehicles 12a-12c may be used to transport executives or staff of a company or organization and their guests. In some embodiments, at least one of the vehicles 12a-12c may be used to transport live or inanimate cargo such as packages, mail, equipment, goods, products, live stock or other animals, plants, scientific samples, organs for transplant, and/or other types of cargo.

In some embodiments, vehicles 12 may transport both people and cargo. Furthermore, although FIG. 1 depicts the vehicles 12a and 12c as aircraft and the vehicle 12b as a truck, the techniques and principles described herein equally apply to other types of vehicles such as automobiles, busses, trains, boats, ships, barges, subway cars, helicopters, ambulances or other emergency vehicles, military vehicles, other air-borne, water-borne, or land-borne vehicles, and vehicles that are suitable for space travel.

Figure 2:
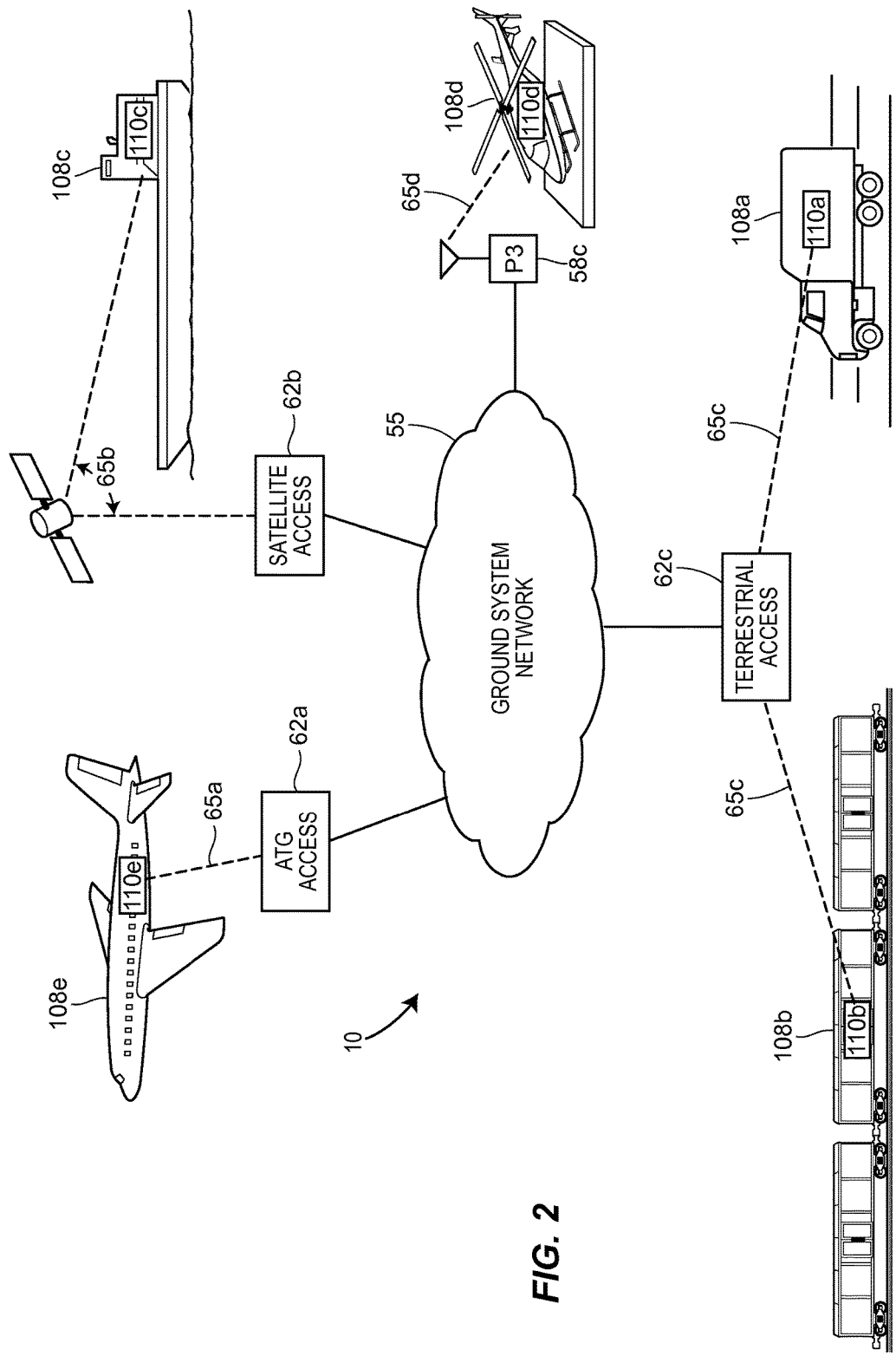
FIG. 2 illustrates examples of various vehicles may communicate with the ground based information data distribution system of FIG. 1.

FIG. 2 illustrates examples of various types of vehicles 108a-108e, each of which may include a respective instance 110a-110e of the on-board information distribution system or device 60 via which one or more communicative connections may be established with the ground based system 10 of FIG. 1. Each instance of the on-board information distribution system 110a-110e may be in communicative connection with at least one of the one or more access networks 62a-62c or with one or more port networks 58a-58c of the ground based system 10, as denoted by the dashed lines. At any given time, a particular instance of the on-board information distribution system 110a-110e on a particular vehicle may be in communicative connection with a different network 62a-62c, 58a-58c than is another instance of the information distribution device on another vehicle. For example, the on-board information distribution device 110c on a ship 108c may be in communicative connection with the ground based system 10 via a satellite communication channel 65b and corresponding satellite access network 62b, while the information distribution system 110b on a train 108b may be in communicative connection with the ground based system 10 via a cellular communications channel 65c and corresponding terrestrial access network 62c.

Returning to the ground based data distribution system 10 of FIG. 1, one or more different types of users may access or use the ground based data distribution system 10. One type of a user may be a passenger on a vehicle 12, such as a customer paying for travel over a route on a commercial airline, ship or train, or an executive traveling on a company jet. Such users are referred to herein as "end-users." Another type of user may be an operator or crew member who is on-board the vehicle during its journey, such as a pilot, an engineer, a flight attendant, a crew member responsible for some aspect of vehicle operation or maintenance, a captain, and the like. Such users are referred to herein as "crew members." Yet another type of user may be an agent of an organization or entity that owns or leases the particular vehicle 12 to provide travel, shipping, emergency, or transport services, such as an airline, a rail company, cruise line, a package or cargo delivery company, the military, a governmental agency, and the like. Typically such an organization or entity has purchased or leased one or more instances of the on-board data distributions devices or systems 60 for use in the vehicles that it owns or operates. Such agents of the organization or entity are referred to herein as "system users." A system user may be, for example, an administrator or Information Technology (IT) professional associated with the organization or entity. Lastly, a type of user may be an agent of the provider, producer or manufacturer of the ground server system 10 itself. Such users are referred to herein as "system providers." In some cases, a system provider of the ground server system 10 may also be a provider of the on-board data distribution devices 60. Typically, a system user has a business or other agreement with the system provider of the ground based system 10 so that the system user, its agents, and its equipment may use the ground based system 10.

In an embodiment, the ground based system 10 may determine one or more predicted locations of a vehicle 12 to which data is to be delivered. In an embodiment, the ground based determination engine 85 included in the computing device 80 of the ground based system 10 may determine or predict the one or more locations. The predicted location may be, for example, a pre-determined destination port, such as indicated by an original, planned travel route of the vehicle 12. In another scenario, the predicted location may be a destination that was not included in the original, planned travel route, such as when a vehicle 12 experiences technical difficulties, weather delays, or other unexpected events that force the vehicle to stop at an interim destination. The predicted location may, in another example, correspond to a location of an access network 62a-62c with which the vehicle 12 is predicted to be in communicative connection during a particular time period whilst the vehicle 12 travels along a route. In yet another example, the ground based determination engine 85 determines more than one predicted location to which the data is to be delivered, such as when the engine 85 does not have sufficient information to narrow a prediction to a single port, or when conditions are so variable (e.g., due to weather, congestion, and the like) that it is possible for the vehicle 12 to eventually arrive at any one of a plurality of locations. In an embodiment, the ground based system 10 may determine the predicted location(s) after the vehicle 12 is en route, that is, the vehicle 12 has departed an origination port to travel over a route, but the vehicle 12 has not yet completed the route.

Additionally or alternatively, the ground based system 10 may determine a content of the data that is to be delivered to the predicted destination or port, in an embodiment. In an embodiment, the ground based determination engine 85 included in the computing device 80 of the ground based system 10 may determine the content of the data that is to be delivered. Examples of data or information content that is to be delivered may include vehicle operation manuals; charts, maps and other information needed for subsequent travel of the vehicle 12; updated or new travel routes or plans; media content such as news, entertainment, safety procedures; data that is directly transmitted by the vehicle 12 and is to be forwarded, and other types of data. In an embodiment, the ground based system 10 may determine the content of the data based on information received from the vehicle 12 and/or received from a remote user 75. The ground based system 10 may obtain the requested data, such as by accessing the data storage devices 78 or by communicating with another network 72. In some scenarios, the information received from the vehicle 12 and/or received from the remote user 75 includes therein at least a portion of the data that is to be delivered.

The ground based system 10 may cause the data to be routed over the network 55 to the predicted location. For example, the ground based determination engine 85 included in the computing device 80 of the ground based system 10 may cause the data to be routed over the network 55 to a predicted location, in some cases, by communicating with the network 58a-58c, 62a-62c at which the information from the vehicle 12 was received. In an embodiment, the ground based system 10 may cause the data to be routed to a port network 58a-58c corresponding to the predicted destination of the vehicle 12. In some scenarios, the data may arrive at the predicted destination port before the vehicle 12 arrives. Upon the vehicle's arrival though, the port network 58a-58c may cause the data to be delivered to the vehicle 12.

In another example, the ground based system 10 may cause the data to be routed over the network 55 to a predicted access network 62a-62c. In some scenarios, the data may arrive at the predicted access network 62a-62c before the vehicle 12 is in communicative connection with the predicted access network 62a-62c. Upon establishing communications with the vehicle 12, the predicted access network 62a-62c of the ground based system 10 may cause the data to be delivered to the vehicle 12, in an embodiment.

An illustrative but non-limiting scenario follows to demonstrate these and other features and capabilities of the ground based system 10. In this example scenario, after a vehicle 12a has departed an origination port and is en route to a destination port but has not yet arrived, data or information may be transmitted from the vehicle 12a to the ground based system 10. For example, the data may be transmitted from an on-board data delivery device 60a of the vehicle 12a over a selected communication channel (e.g., channel 65a) to a respective access network (e.g., access network 62a) and to the ground based system 10. The ground based system 10 may determine, based on the data received from the vehicle 12a, a destination at which the vehicle 12a is predicted to arrive. In some embodiments, the ground based system 10 may determine a predicted time of arrival. For example, the ground based system 10 may default the predicted destination and time of arrival to the originally planned destination and time of arrival which may be stored, in an embodiment, in the data storage device 78 or in another storage device that is accessible by the ground based system 10. The default predicted destination and/or time of arrival, though, may be updated while the vehicle 12a is en route. For instance, while the vehicle 12a is en route, the vehicle 12a may transfer data via the access network 62a that indicates a change in destination port or time. In some embodiments, the data may include exact information, such as the identity of the changed destination port. In some embodiments, the ground based system 10 may infer the change from the data, such as when the vehicle 12 provides an updated average speed, and the ground based system extrapolates an updated time of arrival based on the updated average speed.

In some embodiments, the ground based system 10 may determine a content of the information or data, and may cause the determined data to be delivered to the predicted destination port. For example, while the vehicle is en route, if a crew member sends a request to have the most up-to-date newscasts available and ready to upload at the vehicle destination, the ground based system 10 may obtain the most-up-to-date newscasts (e.g., from the data storage device 78 or from some other storage device accessible to the ground based system 10), and may deliver, via the network 55, the most up-to-date newscasts to a port network 58a-58c corresponding to the predicted destination. Upon arrival at the destination port, the vehicle 12 (or an on-board data distribution device of the vehicle 12) may upload the most up-to-date newscasts from the port network 58a-58c onto the vehicle 12.

In some embodiments, a remote user (e.g., a user at the computing device 75) may transmit or transfer, to the ground based system 10, information or data corresponding to the vehicle 12. The user 75 may transmit or transfer the data while the vehicle 12 is stationed at a port or while the vehicle 12 is traveling en route between an origination and a destination. For example, the remote user 75 may be a system user, and may request the ground based system 10 to deliver charts, maps, and travel plans related to a subsequent leg of travel of the vehicle 12. In another example, the remote user 75 may indicate updates to preferences for selecting bearer or communication channels for use in data transfer to and from the vehicle 12, such as described in aforementioned co-pending U.S. patent application Ser. No. 13/675,200 entitled "VEHICLE DATA DISTRIBUTION SYSTEM AND METHOD." Other types of remote user requests may be possible. A remote user 75 may indicate whether or not the information is to be transferred to the vehicle 12 upon its arrival at a port, or whilst the vehicle 12 is in transit.

Upon reception of the user request, the ground based system 10 may determine or verify one or more predicted location(s) of the vehicle 12. The ground based system 10 may obtain the data or information that is to be delivered to the vehicle 12 at the predicted location, and may route the data or information to a port network 58a-58c or access network 62a-62c corresponding to the predicted location. For example, the ground based system may obtain charts, maps and travel plans corresponding to the subsequent leg or route (e.g., from the data storage device 78 or from some other storage device accessible to the ground based system 10), and may deliver, via the network 55, the charts, maps and travel plans to a port network 58a-58c corresponding to the predicted destination. In another example, the ground based system 10 may obtain updated user bearer selection preferences either directly from the user 78 or from a data storage device at which the user has stored the updated preferences (e.g., data storage device 78) and may deliver, via the network 55, the updated user bearer selection preferences to a port network 58a-58c corresponding to the predicted destination. Upon arrival at the destination port, the vehicle 12 (or an on-board data distribution device of the vehicle 12) may upload or transfer the data or information from the port network 58a-58c onto the vehicle 12, in a manner such as previously discussed.

Thus, the ground based system 10 may receive data generated by a person or device that is on-board the vehicle 12 while the vehicle 12 is traveling en route from an origination to a destination, in some scenarios. In some scenarios, the ground based system 10 may receive data or requests for delivery of data corresponding to the vehicle 12 from a remote user, either while the vehicle 12 is en route or while the vehicle 12 is stationed at a port. In some scenarios, the ground based system 10 may receive data generated by a person or device on-board the vehicle 12 or while the vehicle 12 is stationed at a port. Based on the received data, the ground based system 10 may determine a predicted location of the vehicle 12, and may determine a content of the data to be delivered to the location. The ground based system 12 may obtain the data and may deliver the data to a port network 58a-58c or to an access network 62a-62c corresponding to the predicted location.

In some embodiments, the ground based system 10 may cause the data to be delivered to another location other than and/or in addition to the predicted location of the vehicle 12. For example, the ground based system 10 may deliver the data to be stored at a data storage device 78 or at some other storage device that is accessible to the network 55. The ground based system 10 may deliver the data to be viewed at a computing device 80. For example, real-time monitoring data of the vehicle 12 collected during vehicle operation may be delivered (sometimes periodically) from the vehicle 12 to the ground based system 10 for storage in a log at the data storage device 78, and/or or for display on a user interface at the computing device 80 or at a remote user interface 75.

The data or information received at the ground based system 10 from the vehicle 12 may include, in an embodiment, information about vehicle operating state or real-time data. The information about the vehicle operating state or real-time data may correspond to operational data, status, and/or performance of the vehicle 12 and/or of equipment and devices thereon. Such information may be collected during passage of the vehicle 12 over a travel route, and may be obtained from navigation, monitoring, or other equipment on-board the vehicle 12. For example, vehicle location and travel monitoring data (e.g., latitude, longitude, altitude, speed, direction, etc.) may be received by the ground based system 10. In another example, weather or traffic conditions observed along the travel route may be collected and transferred to the ground based system 10. In an embodiment, the data or information received by the ground based system 10 may include vehicle health and/or trend monitoring data, which may be later used in aggregation with data from other travel routes of the vehicle 12 and/or with data obtained from other vehicles. Vehicle safety data may be received by the ground based system 10, in an embodiment. For example, the data or information transferred from the vehicle 12 while the vehicle 12 is en route may include "black box" or crash survival memory unit data for a particular segment of time.

The data or information transmitted by the vehicle 12a to the ground system 10 may correspond to live or inanimate cargo that is on-board the vehicle 12. For example, monitoring data of live cargo (e.g., livestock, plants, cultures, human organs for donation, etc.) may be periodically transferred from the vehicle 12a to the ground system 10 for delivering to a predicted location of the vehicle 12 or to another location. In another example, environmental conditions of the area of the vehicle 12a in which the cargo is stored (e.g., temperature, pressure, etc.) may be transmitted.

In an embodiment, the data or information transmitted by the vehicle 12a to the ground based system 10 may include information, data or a request generated by a passenger, crew member, or end-user who is traveling on-board the vehicle 12. For example, a passenger or end-user on a medical flight may transfer real-time data regarding the status of a critically injured patient, so that appropriate medical equipment and personnel will be ready and waiting when the vehicle 12 arrives at its destination point. A crew member may send a request for consumer items that need restocking when the vehicle 12 arrives at a destination point. An executive traveling on a company jet or an administrative assistant at a remote location may send a request for certain physical files or other items to be delivered to the arrival gate of the destination port.

Some types of data that are transferred from the vehicle 12a to the ground based system 10 while the vehicle 12a is en route may only be a one-time transfer, e.g., a crew request. Some types of data may be periodically updated along the travel route, such as monitoring data. Data transfers that are initiated by remote users (e.g., at the computing device 75) may be performed manually at any time or may be scheduled. For example, a system user may remotely request that the ground based system 10 uploads a pertinent software update for a particular type of device included in each vehicle of the system user's vehicle fleet. The system user may specify that the software update is to be performed the next time each vehicle in the fleet docks at a port, or that the software update is to be performed the next time each vehicle arrives at a designated port for standard maintenance.

Figure 3:
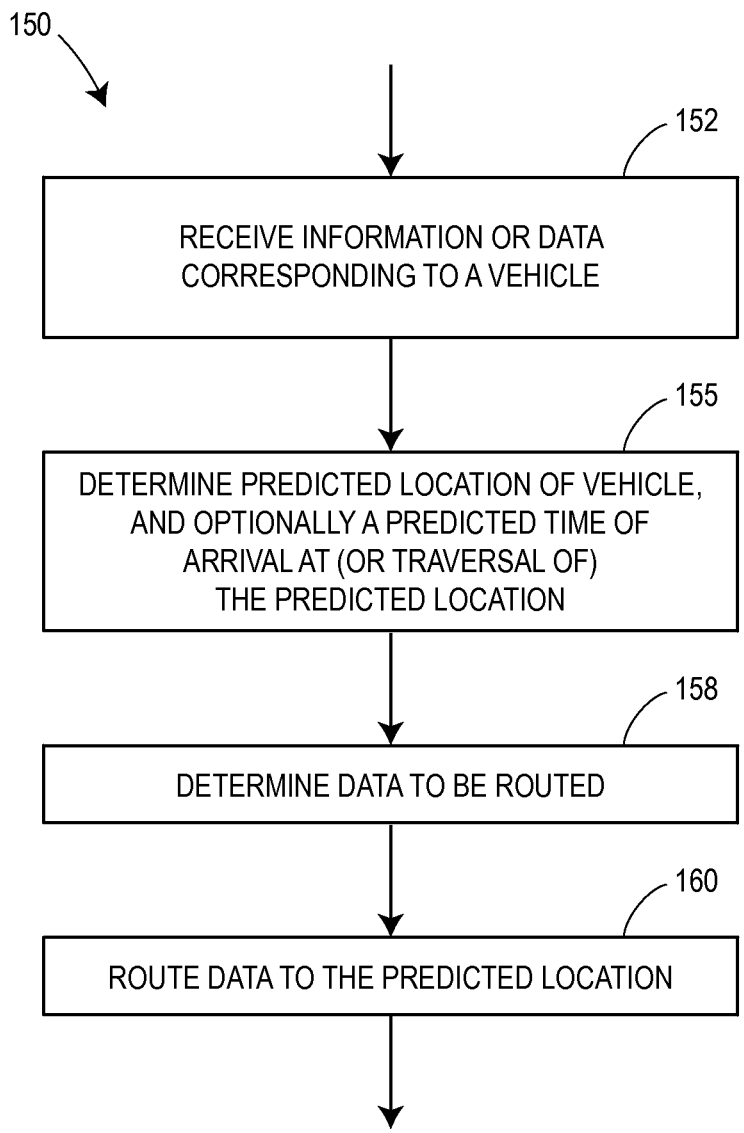
FIG. 3 is an example method for distributing data or information to a vehicle.

FIG. 3 illustrates an embodiment of a method 150 of distributing data or information to a vehicle. The method 150 may operate in conjunction with the ground based data distribution system 10 of FIG. 1, in an embodiment, or the method 150 may operate in conjunction with other systems. In an embodiment, at least a portion of the method 150 may be performed by the ground based determination engine 85 of FIG. 1. For clarity, the method 150 is discussed below with reference to FIGS. 1 and 2.

At a block 152, information or data corresponding to a vehicle 12 may be received at a computing device that is external to and is not transported by the vehicle 12. For example, the computing device at which the information or data is received may be a computing device included in an access network 62a-62c, a computing device included in a port network 68a-68c, the computing device 80, another computing device included in the ground based system 10, or a remote computing device 75 in communicative connection with the ground based system 10. In an embodiment, the information or data may be received at the computing device via a wireless communication channel.

The information or data may be received while the vehicle 12 is en route between an origination point and a destination point, or the information or data may be received while the vehicle 12 is stationed at or moving about a port but is not otherwise progressing along a travel route. At least a portion of the received information or data may have been transmitted by the vehicle 12, and/or at least a portion of the received information or data may have been transmitted by another computing device that is external to and not transported by the vehicle 12, e.g., a remote computing device 75 accessing the ground system 10 via a web portal or another computing device included in or in communicative connection with the ground based system 10.

In embodiments where at least a portion of the received information or data is transmitted by the vehicle 12, the information or data may be received (block 152) using a wireless communication channel. The wireless communication channel may correspond to a selected bearer of a plurality of bearers. The plurality of bearers may be of different types and may correspond to a plurality of interfaces that are included in an on-board data distribution device 110 of the vehicle 12, in an embodiment. The on-board data distribution device 110 may select the bearer over which the information or data is transmitted from the vehicle 12, in an embodiment.

At a block 155, one or more locations at which the vehicle 12 is predicted to arrive or traverse may be determined, e.g., one or more predicted locations. In an embodiment, the ground based system 10 may determine the one or more predicted locations. For example, the ground based determination engine 85 included in the ground based system 10 may determine the one or more predicted locations. In some embodiments, the one or more predicted locations may include a port at which the vehicle 12 is predicted to arrive, e.g., a predicted destination port. The predicted destination port may be one of a plurality of ports at which vehicles may arrive and from which vehicles may depart, for example. In some embodiments, the one or more predicted locations may correspond to locations of access networks 62a-62c with which the vehicle 12 is predicted to be in communicative connection whilst the vehicle 12 travels along a route. In an embodiment, the one or more predicted locations may be determined by the ground based system 10. For example, the ground based determination engine 85 included in the ground based system 10 may determine the one or more predicted locations.

In some embodiments, the one or more predicted locations may be determined (block 155) by the computing device at which the information or data was received (block 152), and in some embodiments, the one or more predicted locations may be determined (block 155) by another computing device in communicative connection with the computing device at which the information or data was received (block 152). The one or more predicted locations may be determined (block 155) while the vehicle 12 is en route between an origination point and a destination point, or the one or more predicted locations may be determined (block 155) while the vehicle 12 is stationed at or moving about a port but is otherwise not progressing along a travel route.

In an embodiment, the one or more predicted locations may be determined (block 155) based on the information or data that was received (block 152). The one or more predicted locations may be determined (block 155) additionally or alternatively based on other information or data that is accessible using the network 55 of the ground based system 10. In some embodiments, the one or more predicted locations may be determined based both on the information or data that was received (block 152), and on the other information or data that is accessible via the network 55 of the ground based system 10. For example, a predicted destination of an aircraft 12a may be determined based on an original flight plan stored at the data storage device 78 or at another data storage device that is otherwise accessible to the network 55, and the predicted destination of an aircraft 12a may be determined also based on monitored, updated flight information received from the aircraft 12a while the aircraft 12a is in flight.

In some embodiments of the block 155, a predicted time of arrival at a predicted location may also be determined. For example, the predicted arrival time may be determined based on the information or data that was received (block 152), on other information or data that is accessible using the network 55 of the ground based system 10, or a combination of the two.

At an optional block 158, a content of the data or information that is to be delivered to the one or more predicted locations may be determined. The content of the data that is to be delivered or routed may be based on the received information (block 152), in an embodiment. For example, the received information may be a request for updated charts for a subsequent leg of the vehicle's route, or the received information may be a request for some other types of information. In an embodiment, at least some of the contents of the received information (block 152) itself may be routed. For example, the received information may include an image of an injury of a patient that is being transported by the vehicle, and the determination may be made (block 158) that the image is to be delivered to a computing device at the destination port so that medical personnel who are meeting the vehicle may prepare for the patient's arrival. At least portions of the block 158 may be performed by the computing device at which the information or data was received (block 152), and/or by the computing device at which the one or more predicted locations were determined (block 155). In an embodiment, the ground based determination engine 85 of the ground based system 10 may determine at least a portion of content of the data to be routed to the one or more predicted locations.

At a block 160, the determined data or information may be caused to be routed to the one or more predicted locations. In an embodiment, the ground based system 10 may cause the determined data or information to be routed. For example, the ground based determination engine 85 of the ground based system 10 may cause the determined information to be routed to the one or more predicted locations via the network 55. In an embodiment, the determined data or information may be routed to the one or more predicted locations before the vehicle 12 has arrived or has traversed the one or more predicted locations.

Figure 4:
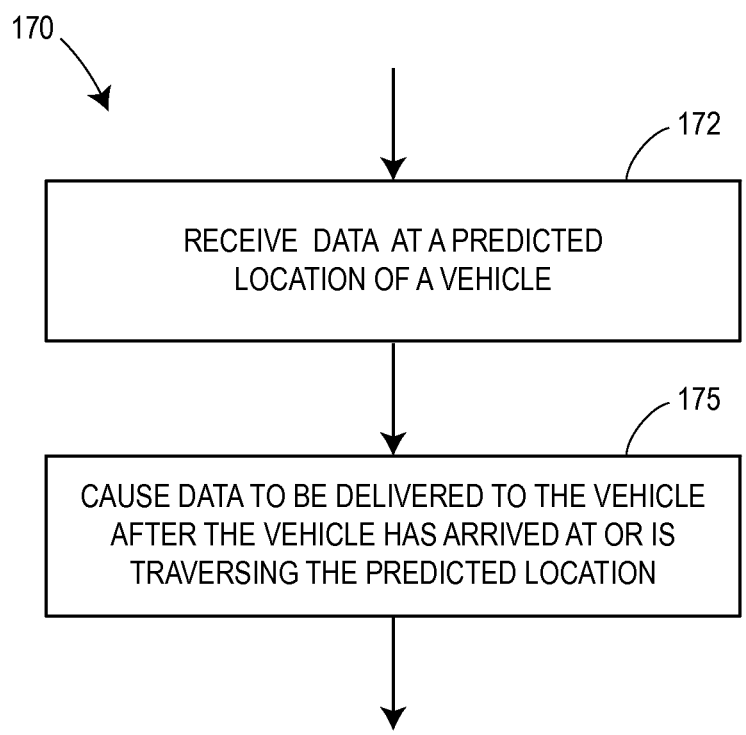
FIG. 4 is an example method for distributing data or information to a vehicle.

FIG. 4 illustrates an embodiment of a method 170 of distributing data or information to a vehicle. The method 170 may operate in conjunction with the ground based data distribution system 10 of FIG. 1, in an embodiment, or the method 170 may operate in conjunction with other systems. In an embodiment, at least a portion of the method 170 may be performed by the ground based determination engine 85 of FIG. 1. In an embodiment, the method 170 may operate in conjunction with the method 150 of FIG. 3. For clarity, the method 170 is discussed below with reference to FIGS. 1, 2 and 3.

At a block 172, information or data corresponding to a vehicle 12 may be received at a location at which a vehicle has been predicted to arrive or at which the vehicle 12 has been predicted to traverse whilst en route, e.g., a predicted location. In an embodiment, the predicted location may be a port at which the vehicle is predicted to arrive, i.e., a predicted destination port. The predicted destination port may be one of a plurality of ports at which vehicles may arrive and from which vehicles may depart, for example. In another embodiment, the predicted location may correspond to a location of an access network 62a-62c with which the vehicle 12 is predicted to be in communicative connection whilst the vehicle 12 travels along a route. In an embodiment, the predicted location may have been determined by the ground based system 10. For example, the ground based determination engine 85 included in the ground based system 10 may have determined the predicted location.

Alternatively or additionally, the content of the received information or data (block 172) may have been determined by the ground based system 10. For example, the ground based determination engine 85 included in the ground based system 10 may have determined at least a portion of the content of the information or data received at the predicted location (block 172).

The information or data may be received (block 172) at a computing device that corresponds to the predicted location, and that is external to and is not being transported by the vehicle 12. For example, the computing device at which the information or data is received may be a computing device included in a port network 68a-68c or in an access network 62a-62c. In an embodiment, the information or data is received (block 172) at the computing device via the network 55 of the ground based system 10.

The information or data may be received at the predicted location (block 172) while the vehicle 12 is en route between an origination and a destination, e.g., the vehicle 12 is progressing along a travel route but has not yet arrived at the predicted location. At least some of the information or data received at the predicted location (block 172) may include data that was generated and transmitted by the vehicle 12 during its progression along its travel route, and/or at least some of the information or data received at the predicted location (block 172) may include data that was transmitted by another computing device that is external to and is not being transported by the vehicle 12, e.g., via a web portal or other computing device in communicative connection with the ground based system 10. In an embodiment, the information or data received at the predicted location (block 172) may have been transmitted by a computing device included in the ground based system 10 (e.g., the computing device 80, a computing device corresponding to one of the networks 58a-58b, 62a-62c, or another computing device included in the ground based system 10). In an embodiment, the information or data received at the predicted location (block 172) may have been transmitted by another computing device that is communicatively connected to the network 55.

At a block 175, the received information or data may be caused to be transmitted to the vehicle 12. In an embodiment, the computing device at which the information or data was received (block 172) may cause the received information or data to be transmitted to the vehicle 12. For example, a computing device corresponding to one of the networks 58a-58c or 62a-62c may cause the received information or data to be transmitted to the vehicle 12. The received information or data may be caused to be transmitted to the vehicle 12 while the vehicle 12 is traveling en route, or while the vehicle 12 has arrived at a port and is parked, stationed or moving about the port.

In an embodiment, the received information or data may be transmitted to the vehicle 12 using a wireless communication channel. The wireless communication channel may correspond to a selected bearer of a plurality of bearers, where the plurality of bearers are of different types and correspond to a plurality of interfaces that are included in on-board data distribution device 110 of the vehicle 12, in an embodiment. The on-board data distribution device 110 may select the bearer over which the information or data is to be transmitted to the vehicle 12, in an embodiment. In an embodiment, the information or data may be transmitted or delivered to the vehicle 12 using the techniques described in aforementioned co-pending U.S. patent application Ser. No. 13/675,200 entitled "VEHICLE DATA DISTRIBUTION SYSTEM AND METHOD".

In an embodiment, the on-board data distribution device 110 and the computing device that causes the received information or data to be transmitted to the vehicle 12 may be in a publisher/subscriber relationship. For example, one of the on-board data distribution device 110 and the computing device may discover the other one, and may initiate authentication procedures. Upon successful authentication, the on-board data distribution device 110 and the computing device may form a publisher/subscriber relationship so that the received information or data (block 172) may be transmitted to the vehicle 12 (block 175). In an embodiment, the publisher/subscriber relationship may be established using a protocol such as the messaging protocol described in aforementioned co-pending U.S. patent application Ser. No. 13/675,194 entitled "PUBLISHER AND SUBSCRIBER MESSAGING SYSTEM AND METHOD".

The systems, methods and techniques described herein allow for data to be routed to a predicted location at a predicted time for just-in-time data delivery to a vehicle 12. For example, the ground based data distribution system 10 may store and forward data that is to be loaded onto a vehicle 12, thus minimizing the time to transfer data to the vehicle 12, and therefore minimizing the time that the vehicle 12 is stopped at the port. Indeed, in some applications, the ground based system 10 may allow for real-time transfer of critical data whilst the vehicle 12 is en route. Users who are on-board the vehicle 12 and users who are not on-board the vehicle 12 may request or specify the data that is to be routed.

Although the foregoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims and all equivalents thereof. By way of example, and not limitation, the disclosure herein contemplates at least the following aspects:

1. An information distribution system for distributing information to a vehicle, comprising: a plurality of computing devices in communicative connection, where at least a first subset of the plurality of computing devices have connections to wireless communication channels for communicating with an on-board data distribution device fixedly connected to the vehicle. Additionally, at least a second subset of the plurality of the computing devices corresponds to respective ports from which vehicles depart and at which vehicles arrive. The information distribution system further comprises a first computing device of the at least the first subset of the plurality of computing devices that is configured to receive, via a respective connection to a respective wireless communication channel, information from the vehicle, and that is configured to cause data to be routed to a second computing device of the plurality of computing devices, the another computing device corresponding to a destination port at which the vehicle is to arrive, and at least one of the data to be routed or the second computing device determined based on the information received from the vehicle.

2. The information distribution system of the previous aspect, wherein the destination port is a predicted destination port at which the vehicle is predicted to arrive.

3. The information distribution system of any of the preceding aspects, wherein the first computing device is further configured to cause the data to be routed to more than one computing device included in the second subset of the plurality of computing devices.

4. The information distribution system of any of the preceding aspects, wherein the destination port of the vehicle is determined by at least one of the first computing device or another computing device included in the plurality of computing devices after the vehicle has departed an origination location and before the vehicle has completed a travel route.

5. The information distribution system of any of the preceding aspects, wherein at least one of: the information is received from the vehicle at the first computing device after the vehicle has left an origination port and before the vehicle has arrived at the destination port; or the data is received at the another computing device prior to the vehicle has arrived at the destination port.

6. The information distribution system of any of the preceding aspects, wherein the vehicle is an airborne vehicle, a water-borne vehicle, or a land-borne vehicle.

7. The information distribution system of any of the preceding aspects, wherein the information received from the vehicle corresponds to at least one of: equipment fixedly connected to the vehicle; cargo aboard the vehicle; a travel route of the vehicle; a request generated by a least one of a passenger aboard the vehicle, a crew member aboard the vehicle, or a remote user of the information distribution system; or information generated by a least one of the passenger, the crew member, or the remote user.

8. The information distribution system of any of the preceding aspects, wherein the data to be routed to the another computing device corresponds to at least one of:

vehicle location monitoring, vehicle system monitoring, vehicle navigation, vehicle operation, vehicle safety, media content, entertainment content, data generated by an end-user of the information distribution system, data generated by an administrator of the information distribution system, a request generated by the end-user, or a request generated by the administrator.

9. The information distribution system of any of the preceding aspects, wherein at least a portion of the plurality of computing devices are included in one or more networks.

10. The information distribution system of any of the preceding aspects, wherein the one or more networks includes a private network.

11. The information distribution system of any of the preceding aspects, wherein the second computing device is configured to receive the routed data, and cause, after the vehicle has arrived at the destination port, the routed data to be transferred to the vehicle using a respective wireless communication channel.

12. The information distribution system of any of the preceding aspects, wherein the second computing device and the on-board data distribution device are authenticated as a publisher and a subscriber to transfer the routed data.

13. The information distribution system of any of the preceding aspects, wherein the wireless communication channel corresponds to a particular bearer of a plurality of bearers having different types, and wherein the on-board data distribution device includes a plurality of interfaces that correspond to the plurality of bearers and that are fixedly connected to the vehicle.

14. A method of distributing information to a vehicle, comprising: receiving, at a first computing device, information corresponding to the vehicle while the vehicle is en route between an origination point and a destination point. The method also comprises determining, by the first computing device or by a second computing device communicatively connected to the first computing device, a destination port at which the vehicle is predicted to arrive, where the destination port is included in a plurality of ports at which vehicles arrive and from which vehicles depart. Additionally, the method comprises causing, by the first computing device, data to be routed to a third computing device communicatively connected to the first computing device, the third computing device corresponding to the destination port and at least one of the data or the third computing device determined based on the information received at the first computing device. In some embodiments, at least a portion of the method of distributing information to a vehicle may be performed by the information distribution system of any of the preceding aspects.

15. The method of the preceding aspect, wherein determining the destination port of the vehicle comprises predicting the destination port of the vehicle after the vehicle has departed the origination point.

16. The method of any of the preceding aspects, wherein causing the data to be routed to the third computing device corresponding to the destination port comprises causing the data to be routed to each of a plurality of computing devices respectively corresponding to each of more than one port of the plurality of ports, the plurality of computing devices including the third computing device.

17. The method of any of the preceding aspects, wherein receiving the information corresponding to the vehicle comprises at least one of: receiving information transmitted from the vehicle using a wireless communication channel, or receiving information corresponding to the vehicle from a computing device that is not being transported by the vehicle.

18. The method of any of the preceding aspects, wherein receiving the information transmitted from the vehicle comprises receiving the information transmitted from the vehicle using a particular bearer of a plurality of bearers, the particular bearer including the wireless communication channel, the plurality of bearers being of different types and corresponding to a plurality of interfaces included in an on-board data distribution device fixedly connected to the vehicle, and the plurality of interfaces for transmitting the information from the vehicle.

19. The method of any of the preceding aspects, wherein receiving the information corresponding to the vehicle comprises receiving the information corresponding to an aircraft.

20. The method of any of the preceding aspects, wherein receiving the information corresponding to the vehicle comprises receiving information corresponding to at least one of: equipment fixedly connected to the vehicle; cargo aboard the vehicle; a travel route of the vehicle; a request generated by a least one of a passenger aboard the vehicle, a crew member aboard the vehicle, or a remote user of the information distribution system; or information generated by a least one of the passenger, the crew member, or the remote user.

21. The method of any of the preceding aspects, wherein causing the data to be routed comprises causing data, including at least one of: vehicle location monitoring, vehicle system monitoring, vehicle navigation, vehicle operation, vehicle safety, media content, entertainment content, data generated by an end-user of the information distribution system, data generated by an administrator of the information distribution system, a request generated by the end-user, or a request generated by the administrator, to be routed.

22. The method of any of the preceding aspects, wherein causing the data to be routed to the third computing device comprises causing the data to be routed to the third computing device using a private network.

23. A method of distributing information to a vehicle, comprising receiving data at a first computing device from a second computing device in communicative connection over a private network with the first computing device, where the first computing device corresponds to a destination port of the vehicle, the destination port is included in a plurality of ports at which vehicles arrive and from which vehicles depart, and at least one of the data or the destination port determined is based on information received at the second computing device while the vehicle is en route between an origination point and a destination point. The method further comprises transmitting, by the first computing device using a wireless communication channel, the received data to an on-board data distribution device fixedly connected to the vehicle after the vehicle has arrived at the destination port. In some embodiments, at least portions of the method are performed by the information distribution system of any of the preceding aspects. In some embodiments, the method is performed in conjunction with the method of any of the preceding aspects.

24. The method of any of the preceding aspects, wherein the wireless communication channel is included in a particular bearer of a plurality of bearers, the plurality of bearers are of different types and correspond to a plurality of interfaces for transferring information to the vehicle, and the plurality of interfaces are included in the on-board data distribution device.

25. The method of any of the preceding aspects, further comprising authenticating, using the wireless communication channel, the first computing device and the on-board data distribution device.

26. The method of any of the preceding aspects, wherein the vehicle is an airborne vehicle, a water-borne vehicle or a land-borne vehicle.

27. The method of any of the preceding aspects, wherein receiving the data corresponds to receiving data corresponding to at least one of: vehicle location monitoring, vehicle system monitoring, vehicle navigation, vehicle operation, vehicle safety, media content, entertainment content, data generated by an end-user of the information distribution system, data generated by an administrator of the information distribution system, a request generated by the end-user, or a request generated by the administrator.

28. The method of any of the preceding aspects, wherein the information received at the second computing device comprises at least one of: equipment fixedly connected to the vehicle; cargo aboard the vehicle; a travel route of the vehicle; a request generated by a least one of a passenger aboard the vehicle, a crew member aboard the vehicle, or a remote user of the information distribution system; or information generated by a least one of the passenger, the crew member, or the remote user.

Thus, many modifications and variations may be made in the techniques and structures described and illustrated herein without departing from the spirit and scope of the present claims. Accordingly, it should be understood that the methods and apparatus described herein are illustrative only and are not limiting upon the scope of the claims.

What is claimed is:

1. A ground-based communications system for distributing information to a vehicle, comprising:
    a plurality of access networks, each of which is fixedly disposed at a different location and supports respective one or more wireless communication channels for communicating with an on-board data distribution device fixedly connected to the vehicle while the vehicle is en route between an origination point and a destination point; and
    one or more computing devices including communicative connections to the plurality of access networks and communicative connections to a set of port networks, each port network included in the set of port networks being fixedly disposed at a different port at which vehicles arrive and from which vehicles depart, and the one or more computing devices configured to:
        receive, from a computing device that is not being transported by the vehicle and that is not included in the ground-based communications system, information corresponding to the vehicle while the vehicle is en route between the origination point and the destination point;
        receive, from the on-board data distribution device via one of the wireless communication channels while the vehicle is en route between the origination point and the destination point, data corresponding to a destination port at which the vehicle is predicted to arrive, the destination port included in the different ports at which vehicles arrive and from which vehicles depart;
        determine, based upon the data received from the on-board data distribution device, the destination port at which the vehicle is predicted to arrive; and
        route, via the communicative connections to the set of port networks, particular data to a particular port network for delivery of the particular data, via the particular port network upon arrival of the vehicle at the destination port, to the on-board data distribution device fixedly connected to the vehicle, the particular port network included in the set of port networks and fixedly disposed at the destination port at which the vehicle is predicted to arrive, and at least one of the particular data or the particular port network determined based on the information received from the computing device that is not being transported by the vehicle and that is not included in the ground-based communications system.

2. The system of claim 1, wherein the particular data is routed to each of a plurality of port networks respectively corresponding to each of more than one port of the different ports, the plurality of port networks including the particular port network fixedly disposed at the destination port at which the vehicle is predicted to arrive.

3. The system of claim 1, wherein the vehicle is an aircraft.

4. The system of claim 1, wherein:
    the information corresponding to the vehicle comprises information corresponding to at least one of:
    equipment fixedly connected to the vehicle;
    cargo aboard the vehicle;
    a travel route of the vehicle;
    a request generated by a remote user of the ground-based communications system; or
    information generated by the remote user; and
    the particular data comprises at least one of: vehicle location monitoring, vehicle system monitoring, vehicle navigation, vehicle operation, vehicle safety, media content, entertainment content, data generated by an end-user of the ground-based communications system, data generated by an administrator of the ground-based communications system, a request generated by the end-user, or a request generated by the administrator.

5. The system of claim 1, wherein the particular port network is a private network.

6. The system of claim 1, wherein the data corresponding to the destination port at which the vehicle is predicted to arrive comprises data indicating the destination port at which the vehicle is predicted to arrive.

7. The system of claim 1, wherein:
    the data corresponding to the destination port at which the vehicle is predicted to arrive comprises data indicative of a time at which the vehicle is predicted to arrive at the destination port; and
    the particular data is routed to the particular port network at the destination port at which the vehicle is predicted to arrive based on the predicted time of arrival of the vehicle at the destination port.

8. A system of computing devices for distributing information to a vehicle, the system comprising:
    a ground-based communications network having (i) communicative connections to a plurality of access networks, each of which supports respective one or more wireless communication channels for communicating with an on-board data distribution device that is fixedly connected to the vehicle, and (ii) communicative connections to a set of port networks disposed at respective, different ports at which vehicles arrive and from which vehicles depart, the ground-based communications network configured to:
        receive, from a computing device that is not being transported by the vehicle and that is excluded from the ground-based communications network, and while the vehicle is en route between an origination point and a destination point, information corresponding to the vehicle and determine, based on the received information, particular data that is to be delivered to the on-board data distribution device that is fixedly connected to the vehicle;

receive, from the on-board data distribution device via a wireless communication channel included in the one or more wireless communication channels of a respective access network, and while the vehicle is en route between the origination point and the destination point, data indicative of a destination port at which the vehicle is predicted to arrive, the destination port included in the different ports at which vehicles arrive and from which vehicles depart; and cause the particular data to be routed to a particular port network disposed at the destination port so that the particular data is available for delivery, via the particular port network, to the on-board data distribution device upon arrival of the vehicle at the destination port.

9. The system of computing devices of claim 8, wherein the destination port at which the vehicle is predicted to arrive comprises an updated destination port of the vehicle after the vehicle has departed the origination point, the updated destination port being different than an original destination port of the vehicle.

10. The system of computing devices of claim 8, wherein the particular data is routed to each of a plurality of port networks respectively corresponding to each of more than one port of the different ports, the plurality of port networks including the particular port network.

11. The system of computing devices of claim 8, wherein the vehicle is an aircraft.

12. The system of computing devices of claim 8, wherein:
the information corresponding to the vehicle comprises information corresponding to at least one of:
equipment fixedly connected to the vehicle;
cargo aboard the vehicle;
a travel route of the vehicle;
a request generated by a remote user of the system; or
information generated by the remote user; and
the particular data comprises at least one of: vehicle location monitoring, vehicle system monitoring, vehicle navigation, vehicle operation, vehicle safety, media content, entertainment content, data generated by an end-user of the ground-based communications system, data generated by an administrator of the ground-based communications system, a request generated by the end-user, or a request generated by the administrator.

13. The system of computing devices of claim 8, wherein at least one of the particular port network or the ground-based communications network is a private network.

14. The system of computing devices of claim 8, wherein:
the ground-based communications network is further configured to receive data indicative of a time at which the vehicle is predicted to arrive at the destination port; and
the particular data is routed to the particular port network at the destination port at which the vehicle is predicted to arrive based on the predicted time of arrival of the vehicle at the destination port.

* * * * *